United States Patent
Pavel et al.

(10) Patent No.: US 9,363,113 B2
(45) Date of Patent: Jun. 7, 2016

(54) METHOD AND APPARATUS FOR CANCELING A PEAK OF AN INPUT SIGNAL

(71) Applicant: Samsung Electronics Co., Ltd, Gyeonggi-do (KR)

(72) Inventors: Martynovich Pavel, Gyeonggi-do (KR); Jaebum Kim, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 113 days.

(21) Appl. No.: 13/732,227

(22) Filed: Dec. 31, 2012

(65) Prior Publication Data

US 2013/0177057 A1 Jul. 11, 2013

(30) Foreign Application Priority Data

Jan. 6, 2012 (KR) .......................... 10-2012-0001834

(51) Int. Cl.
 H03D 1/04 (2006.01)
 H04L 25/08 (2006.01)
 H04L 27/26 (2006.01)

(52) U.S. Cl.
 CPC ............ *H04L 25/08* (2013.01); *H04L 27/2623* (2013.01)

(58) Field of Classification Search
 None
 See application file for complete search history.

(56) References Cited

U.S. PATENT DOCUMENTS

2013/0230121 A1* 9/2013 Molko et al. .................. 375/295
2014/0072073 A1* 3/2014 Azadet et al. ................. 375/296

\* cited by examiner

*Primary Examiner* — Adolf Dsouza (57) ABSTRACT

A method for removing a peak of an input signal includes forming a peak group including multiple peaks having an amplitude greater than a preset signal threshold value in the input signal, generating a cancellation pulse corresponding to the peak group, and generating a output signal by subtracting the cancellation pulse from the input signal.

20 Claims, 12 Drawing Sheets

METHOD AND APPARATUS FOR CANCELING A PEAK OF AN INPUT SIGNAL

CROSS-REFERENCE TO RELATED APPLICATION(S) AND CLAIM OF PRIORITY

The present application is related to and claims priority under 35 U.S.C. §119(a) to a Korean Patent Application filed in the Korean Intellectual Property Office on Jan. 6, 2012 and assigned Serial No. 10-2012-0001834, the contents of which are herein incorporated by reference.

TECHNICAL FIELD OF THE INVENTION

The present invention generally relates to signal processing, and more particularly, to a method and apparatus for canceling a peak of an input signal.

BACKGROUND OF THE INVENTION

Amplification of a signal having a high peak-to-average ratio (PAR) is generally considered to be inefficient. The reason is that a high power amplifier (HPA) is required for processing a significantly large amount of input back-off when amplifying such a signal. One solution to this problem has been to use a PAR reduction algorithm. The PAR reduction algorithm is commonly used in many radio frequency (RF) transmitters. The algorithm is also called a crest factor reduction (CFR).

The CFR is operated in several modes. Among them, a peak cancellation technique will be described. The peak cancellation technique searches a peak in a given signal to reduce or cancel the peak.

Figure 1:
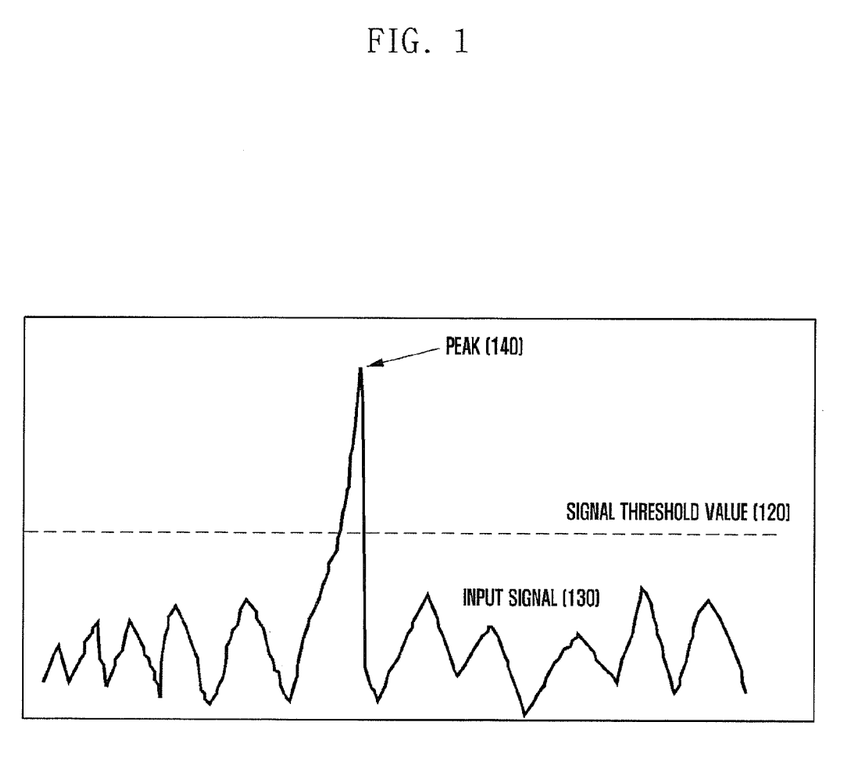
FIG. 1 illustrates an input signal 130 of a peak cancellation method according to the related art.
Figure 2:
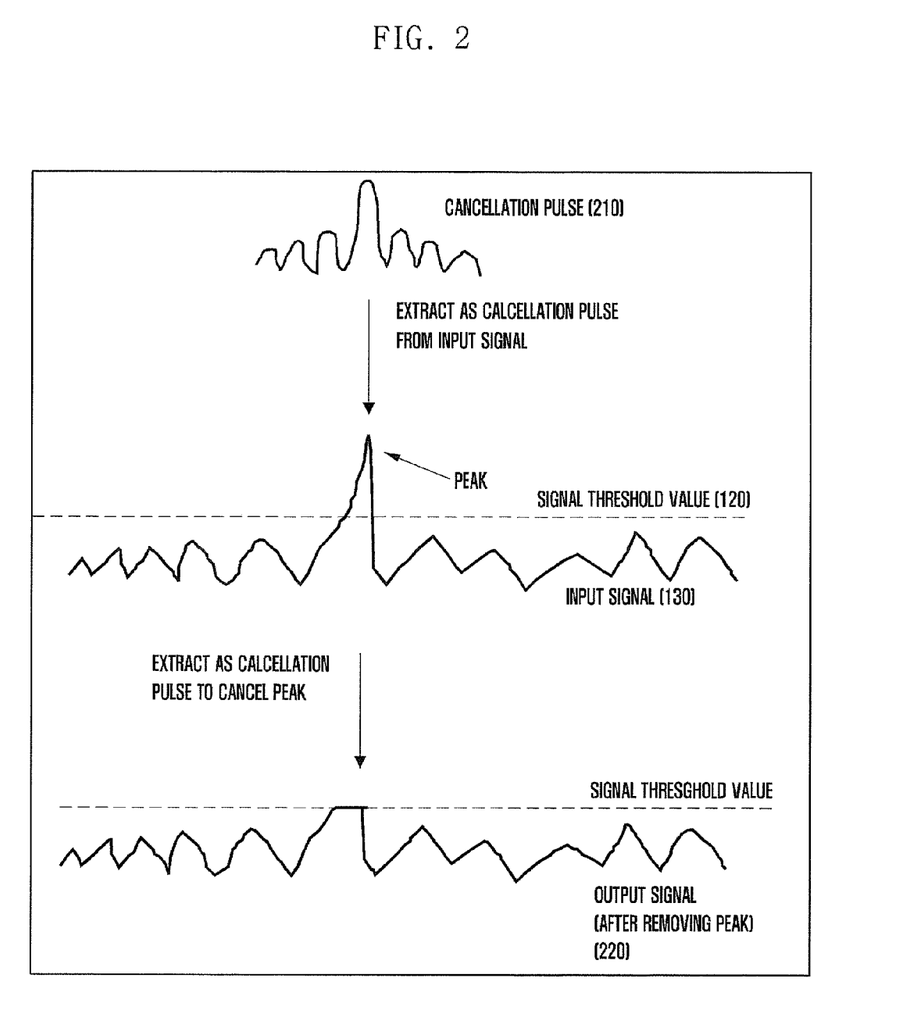
FIG. 2 illustrates a method for applying a cancellation pulse according to the related art.

A vertical axis indicates a size (e.g., amplitude) and a horizontal axis indicates a time in FIGS. 1 and 2.

FIG. 1 illustrates an input signal 130 of a peak cancellation mode according to the related art.

The apparatus for canceling the peak searches a portion, i.e., a peak 140, having an amplitude that exceeds a preset signal threshold value 120 in the input signal 130. The technique generates a cancellation pulse using a parameter for a newly sensed peak, e.g., amplitude, phase, and position.

FIG. 2 illustrates a method for applying a cancellation pulse according to the above-cited technique.

The method subtracts the cancellation pulse 210 from the input signal 130 to reduce or cancel the peak 140. An output signal 220 having a reduced peak 140 is shown below with respect to FIG. 3.

Figure 3:
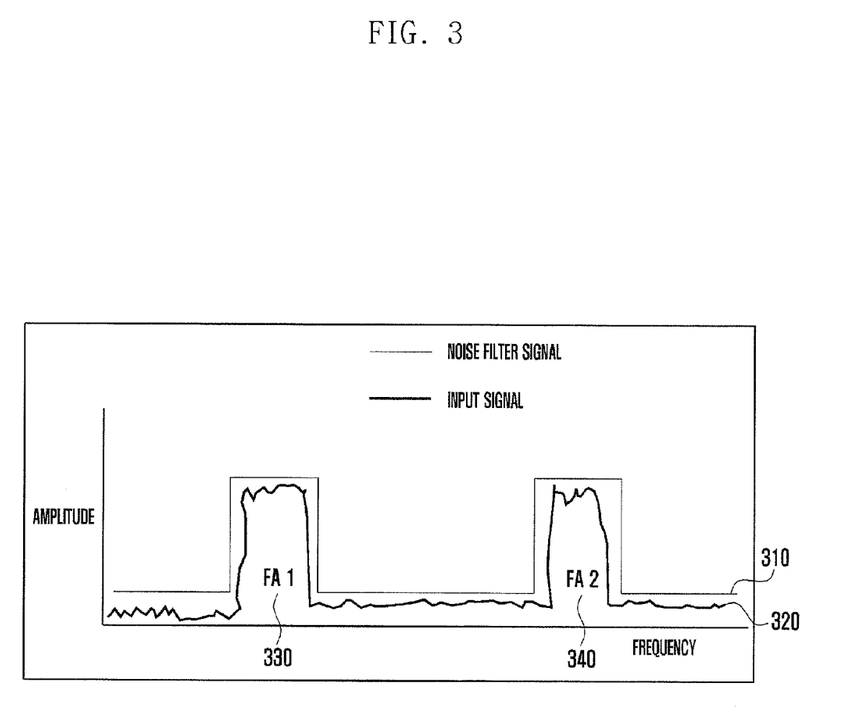
FIG. 3 illustrates a noise filter signal 310 of a noise shaping filter according to the related art.

FIG. 3 illustrates a noise filter signal 310 of a noise shaping filter according to the related art. A horizontal axis indicates a frequency and a vertical axis indicates a size (e.g., amplitude). The noise filter signal has two frequency allocations (FA) 330 and 340.

The noise filter considers an impulse, i.e., the noise filter signal 310 of the noise shaping filter as well as the parameter for the peak so as to calculate the cancellation pulse. Hereinafter, an impulse response of the noise shaping filter is named as a noise filter signal. The noise filter signal is used to cancel the noise of the input signal. In addition, the noise filter signal 310 is designed to match the input signal 130 with the power spectrum. According to such a method, the cancellation pulse does not generate much noise in a region except for a signal carrier bandwidth.

However, according to the CFR algorithm, the noise filter processes the peaks one by one. Therefore, the noise filter is configured to generate one cancellation pulse at the same time, and may process the peaks one at a time. The noise filter needs to have several configurations capable of generating the cancellation pulse in order to process the several peaks. However, when several peaks are generated within a short time according to characteristics of the signal, an appropriate process is required.

SUMMARY OF THE INVENTION

To address the above-discussed deficiencies of the prior art, it is a primary object to provide a method and an apparatus for canceling a peak configured to cancel peaks when several peaks are generated within a relatively short time in an input signal.

In accordance with an aspect of the present invention, a method for canceling a peak of an input signal includes: forming a peak group including multiple peaks having an amplitude greater than a preset signal threshold value in the input signal, generating a cancellation pulse corresponding to the peak group, and generating a output signal by subtracting the cancellation pulse from the input signal.

In accordance with another aspect of the present invention, an apparatus for canceling a peak of an input signal includes: a peak group sensor forming a peak group including multiple peaks having an amplitude greater than a preset signal threshold value in the input signal, a cancellation pulse generator (CPG) generating a cancellation pulse corresponding to the peak group, and a signal subtraction unit generating a output signal by subtracting the cancellation pulse from the input signal.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION OF THE INVENTION

FIGS. 4 through 11, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged signal processing devices. Exemplary embodiments of the present invention are described with reference to the accompanying drawings in detail. The same reference numbers are used throughout the drawings to refer to the same or like parts. Detailed descriptions of well-known functions and structures incorporated herein may be omitted to avoid obscuring the subject matter of the present invention.

Hereinafter, an apparatus for a peak cancellation of an input signal according to an embodiment of the present invention will be described with reference to the accompanying drawings.

Figure 4:
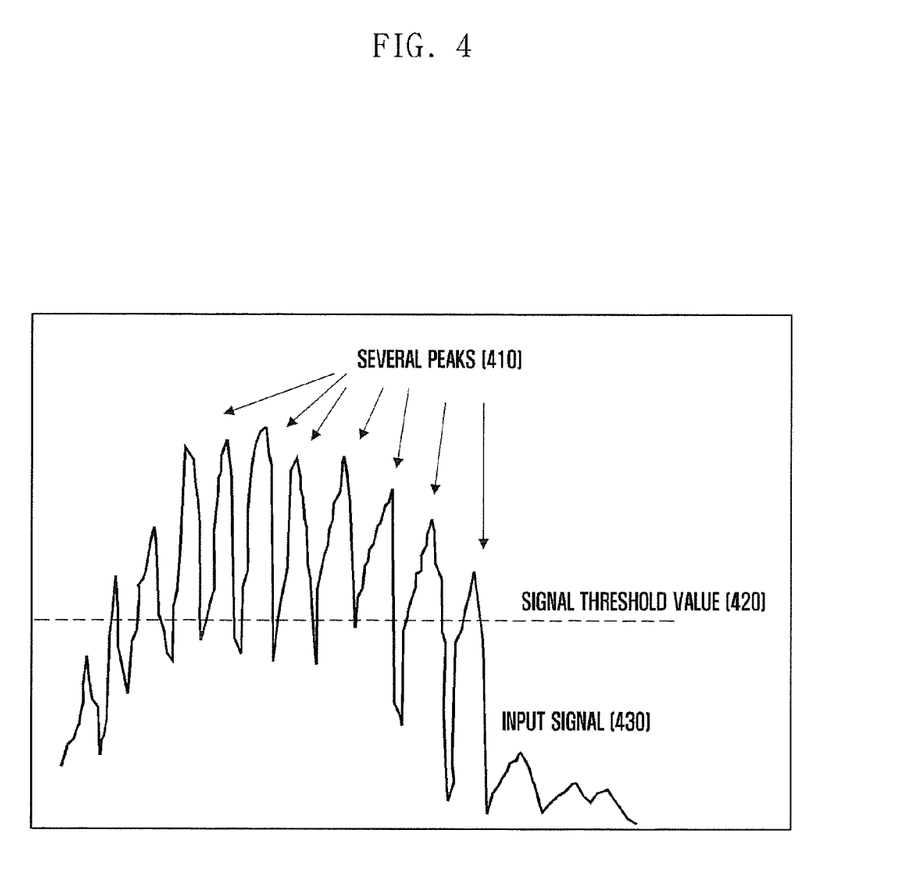
FIG. 4 illustrates an example input signal including several peaks within a relatively short time.

FIG. 4 illustrates an example input signal including several peaks within a relatively short time.

Referring to FIG. 4, several peaks 410 corresponding to a size (e.g., amplitude) exceeding a signal threshold value 420 in the input signal 430 exist. It may be generally difficult to treat such signals.

Figure 5:
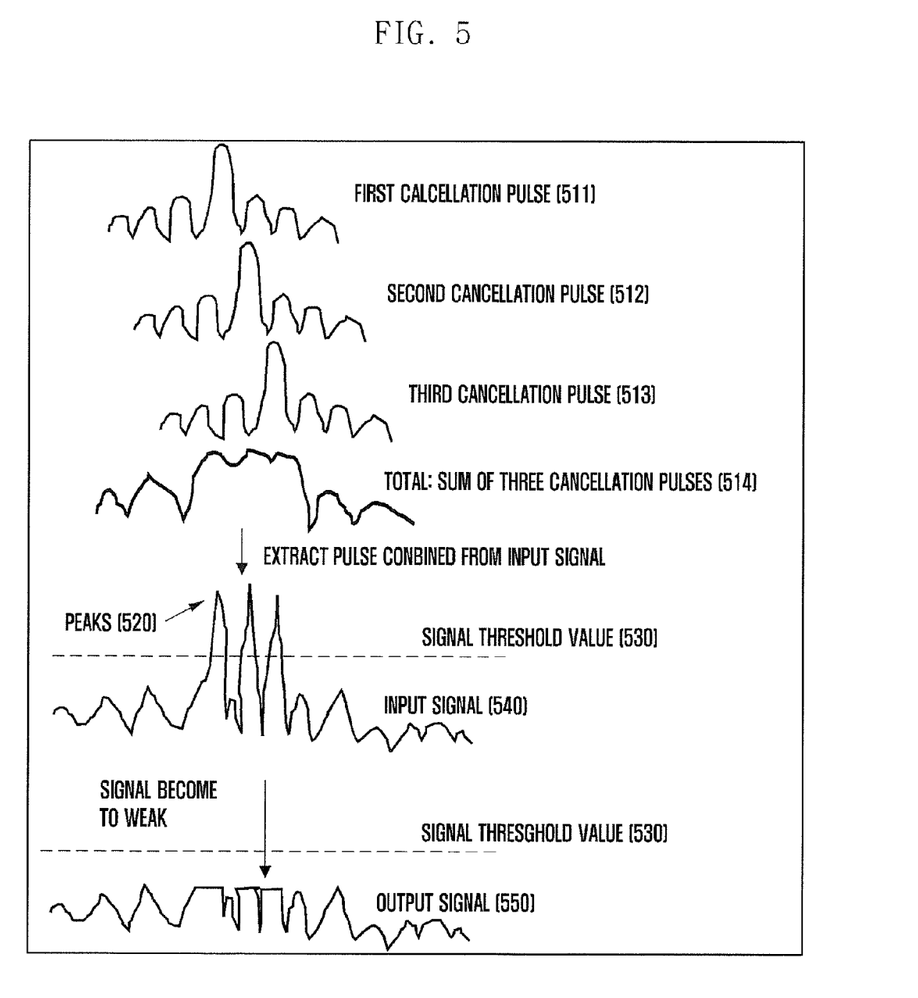
FIG. 5 illustrates an example method of individually processing several peaks included in the input signal within the short time according to the teachings of the present disclosure.

FIG. 5 illustrates an example method for individually processing the peaks included in the input signal within the relatively short time.

Here, there are three peaks 520 exceeding a signal threshold value 530 in the input signal 540. The cancellation pulse generator generates the cancellation pulses 511, 512, and 513 in order to cancel the peaks. All of the cancellation pulses 511, 512, and 513 are summed up to become a sum-pulse 514. The apparatus for peak cancellation subtracts the sum-pulse 514 from the input signal 540 to generate the output signal 550. In this case, the cancellation pulses of several peaks are added within short time, and thus, the peak portion is excessively reduced. Referring to FIG. 5, as the input signal is excessively modified, this method is not appropriate.

Figure 6:
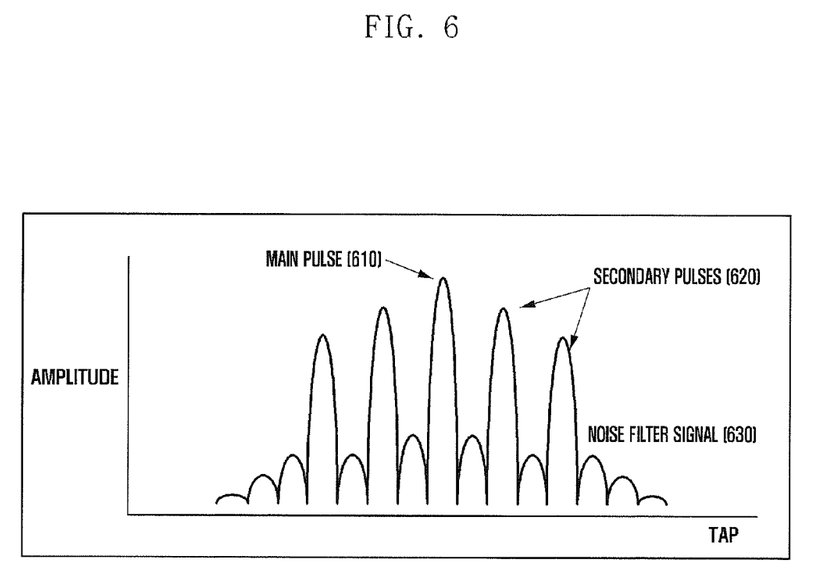
FIG. 6 illustrates an example noise filter signal of a noise-shaping filter according to the teachings of the present disclosure.

FIG. 6 illustrates an example noise filter signal 630 of a noise-shaping filter. A horizontal axis indicates a time and a vertical axis indicates a size (e.g., amplitude). In FIG. 3, the noise filter signal is illustrated in view of the size axis-frequency axis.

In FIG. 6, the noise filter signal 630 is generated when a plurality of frequencies are allocated, as shown in FIG. 3. According to an embodiment, a waveform of the noise filter signal 630 may be changed. Referring to FIG. 6, the noise filter signal 630 includes a main pulse 610 and several secondary pulses 620.

Figure 7:
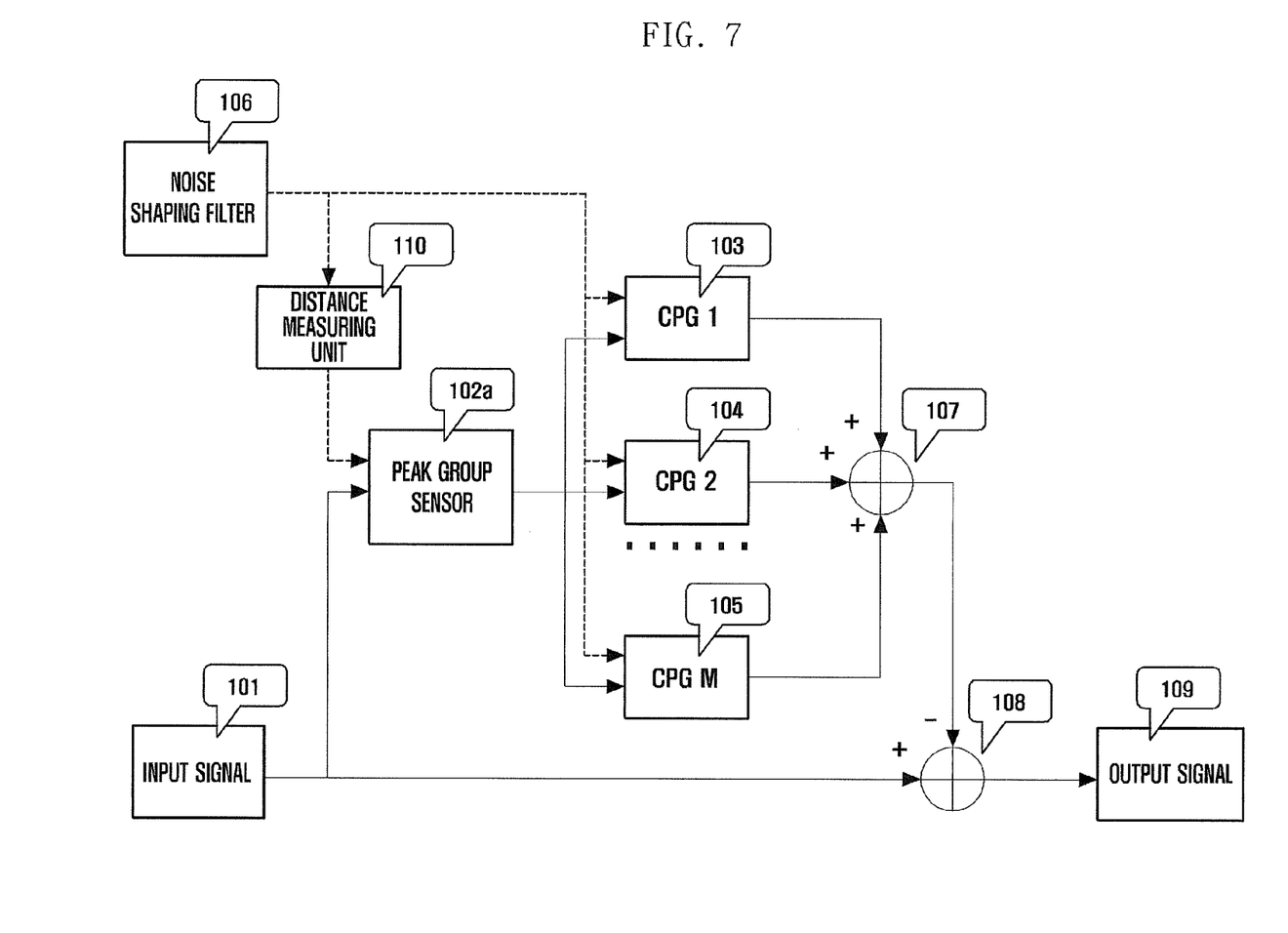
FIG. 7 illustrates an example apparatus for peak cancellation according to an embodiment of the present invention.

FIG. 7 illustrates an example apparatus for peak cancellation according to an embodiment of the present invention.

Referring to FIG. 7, the apparatus for peak cancellation includes a noise-shaping filter 106, a distance measuring unit 110, a peak group sensor 102a, a cancellation pulse generators (CPG) 103, 104, and 105, a signal sum unit 107, and a signal subtraction unit 108.

The noise-shaping filter 106 transmits the noise filter signal to the distance measuring unit 110, and the cancellation pulse generators 103, 104, and 105.

Figure 8:
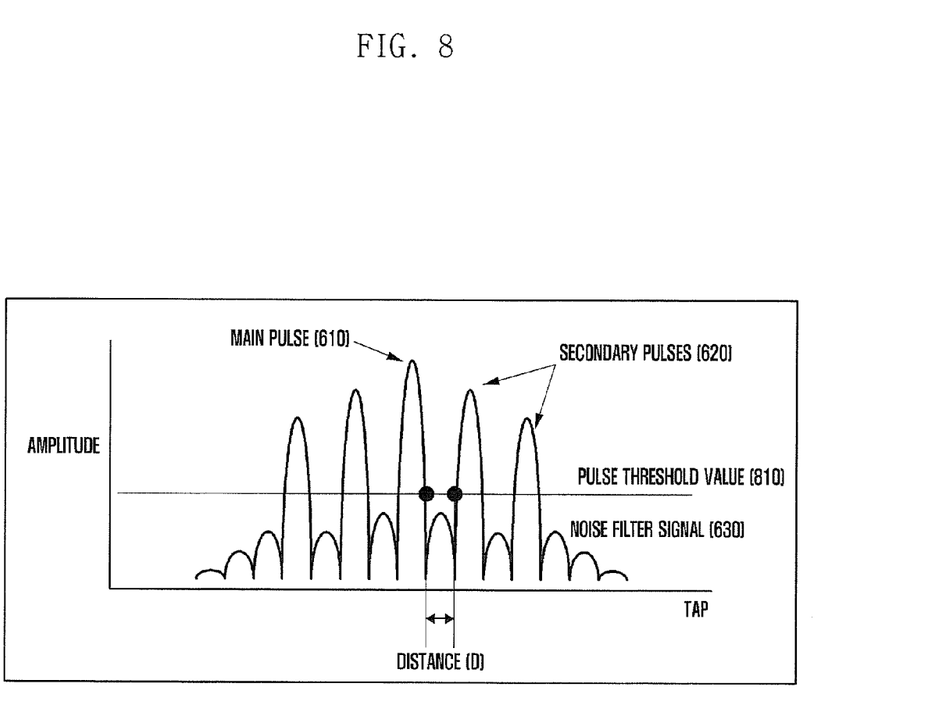
FIG. 8 illustrates an example noise filter signal of the noise-shaping filter according to an embodiment of the present invention.

FIG. 8 illustrates an example noise filter signal 630 of the noise-shaping filter 106 according to an embodiment of the present invention. The peak (e.g., amplitude) of the noise filter signal 630 is the part exceeding a pulse threshold value 810 among the noise filter signal 630.

The distance (D) between peaks of the noise filter signal 630 is measured in the distance measuring unit 110. Later, the measured distance becomes a reference distance for forming a peak group. For example, the distance between the main pulse 610 and the secondary pulse 620 may include the reference distance. As another example, an average distance between neighboring pulses 610 and 620 may include the reference distance. As shown in FIG. 8, the boundary of pulses 610 and 620, i.e., the distance between parts in which the noise filter signal 630 and the pulse threshold value 810 line meet each other may include the reference distance. The noise filter signal 630 may have various shapes in addition to the shape illustrated in FIG. 8 according to an embodiment of the present invention.

Although a specific example determining the reference distance is disclosed, the reference distance may be determined by other methods, for example, an experimental method. In this case, the distance measuring unit may not be required, and a preset reference distance is provided to the peak group sensor 102a.

According to the modified example, a distance between the highest parts of each pulse may include the reference distance. However, according to this modified example, another method of sensing the peak group may be used when the peak group is formed later.

Hereinafter, it is assumed that the boundary of the pulses 610 and 620, i.e., the distance between parts in which the noise filter signal 630 and the pulse threshold value 810 line meet each other is set the reference distance.

The peak group sensor 102a receives the input signal 101 and forms the peak group including multiple peaks having an amplitude greater than a preset signal threshold value in the input signal 101. The signal threshold value may be determined by an experimental method or other suitable method. The peak group sensor 102a senses the plurality of peaks having an amplitude greater than the preset signal threshold value in the input signal 101, measures the distance between neighboring peaks, and forms one peak group when the distance between the peaks is within a reference distance received from the distance measuring unit 110.

Figure 9:
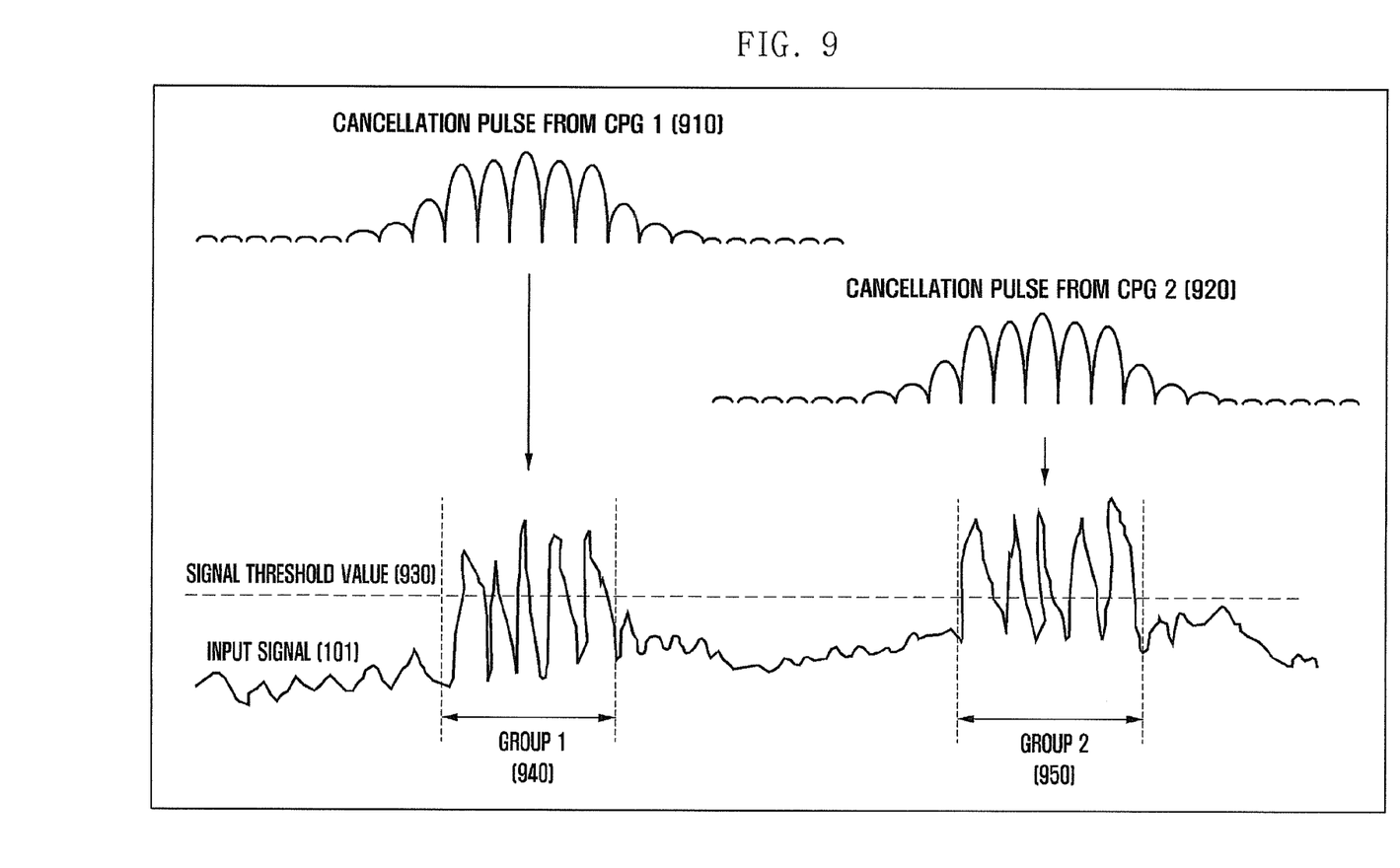
FIG. 9 illustrates example cancellation pulse generation according to an embodiment of the present invention.

FIG. 9 illustrates a cancellation pulse generation according to an embodiment of the present invention.

The peak group sensor 102a analyzes an input signal 101 to sense multiple peaks of a preset signal threshold value 930. That is, the peak group sensor 102a senses the peaks belonging to a first group 940 and a second group 950. The peak group sensor 102a measures the distance between sensed peaks, i.e., the distance between neighboring peaks.

The peak group sensor 102a forms one peak group when the distance between the measured peaks is within a reference distance received from the distance measuring unit 110.

In FIG. 9, a first group 940 and a second group 950 are formed. The peak group sensor 102a transfers a parameter for the sensed peak group, e.g., position, size (e.g., amplitude), phase, and the like to the cancellation pulse generators 103, 104, and 105. The peak group parameter transferred to the cancellation pulse generators 103, 104, and 105 includes information required for generating a cancellation pulse. That is, the peak group parameter includes at least one of the position of the peak, the (average) size (e.g., amplitude) of the peak, and the phase of the peak, which are information required for generating the cancellation pulse capable of removing the peak.

Each of the cancellation pulse generators 103, 104, and 105 may generate a pulse which simultaneously cancels one peak group. Therefore, the peak group sensor 102a may transfer the sensed parameter of the first group 940 to the first cancellation pulse generator 103 and transfer the sensed parameter of the second group 950 to the second cancellation pulse generator 104.

The cancellation pulse generators 103, 104, and 105 generate the cancellation pulse corresponding to the peak group parameter received thereto. Here, the cancellation pulse should be shaped like the peak part as far as possible as the peak should be canceled later on by subtracting cancellation pulses from the input signal. The cancellation pulse generation method for canceling the peak may use several methods. The first cancellation pulse generator 103 generates the cancellation pulse corresponding to the first group 940. The second cancellation pulse generator 104 generates the cancellation pulse corresponding to the second group 950. The generated cancellation pulse is transferred to the signal sum unit 107. When a cancellation pulse is generated for every peak, a number of cancellation pulse generators are used. However, according to an embodiment of the present invention, only one cancellation pulse is used in one group by grouping several peaks, such that even a relatively small number of cancellation pulse generators may cancel a relatively large number of peaks.

The signal sum unit 107 generates a sum pulse obtained by summing all of the cancellation pulses from the cancellation pulse generators 103, 104, and 105.

As shown in FIG. 9, each cancellation pulse is generated for a different peak group and each peak group is separated by a specified distance. Accordingly, each cancellation pulse is separated by a specified distance or more, thereby making it possible to prevent the peak from being excessively canceled as shown in FIG. 5.

The signal subtraction unit 108 generates the output signal 109 by subtracting the sum pulse from the input signal 101. The output signal 109 has a shape in which a relatively large part of the peaks of the input signal 101 has been canceled.

Figure 10A:
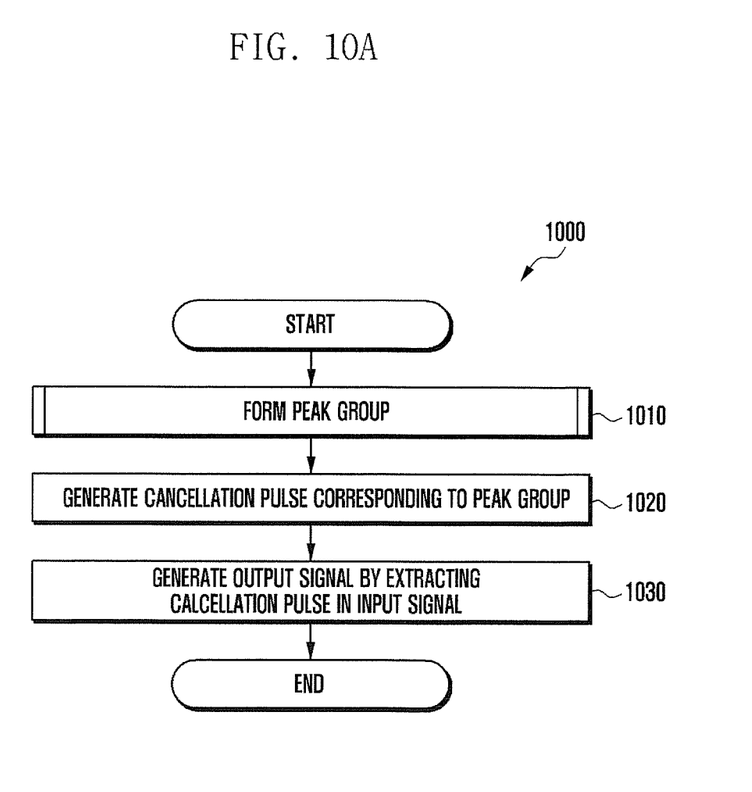
FIG. 10A illustrates an example peak canceling process according to an embodiment of the present invention.

FIG. 10A illustrates an example peak canceling process according to an embodiment of the present invention.

Referring to FIG. 10A, the peak group sensor 102a forms a peak group including multiple peaks having an amplitude greater than a preset signal threshold value in the input signal (1010).

Figure 10B:
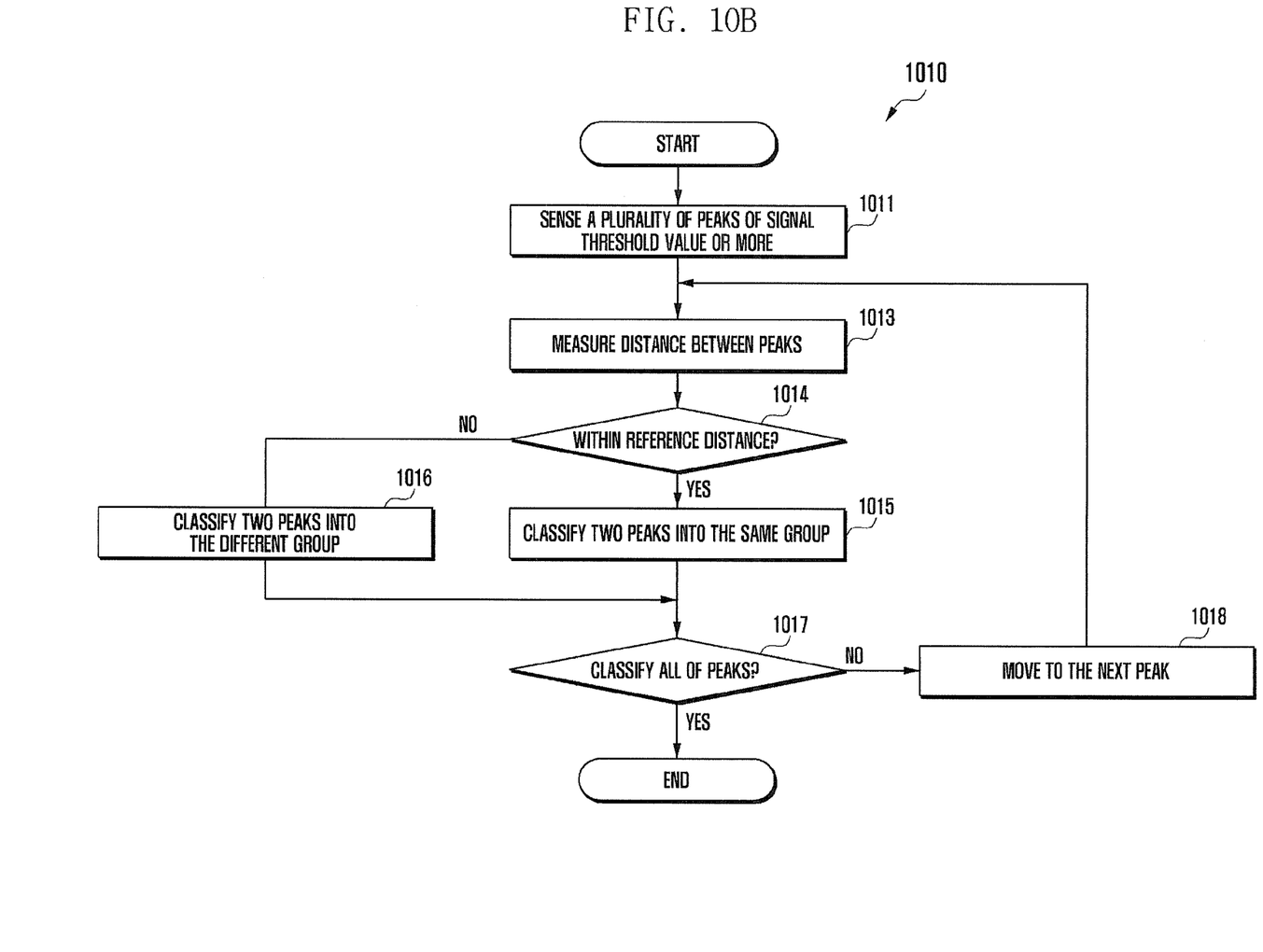
FIG. 10B illustrates an example peak group formation process according to an embodiment of the present invention.

FIG. 10B illustrates an example peak group formation process (1010) according to the embodiment of the present invention.

Referring to FIG. 10B, the peak group sensor 102a senses multiple peaks having an amplitude greater than a preset signal threshold value in the input signal (1011). The signal threshold value may be determined by the experimental method or other suitable method. Referring to FIG. 9, the peak group sensor 102a may sense the peaks corresponding to the first group 940 and other peaks corresponding to the second group 950.

The peak group sensor 102a measures the distance between the peaks (1013). For example, the distance between the peaks may be a distance between boundary lines of the peaks. The boundary line of the peak is a part in which the input signal intersects the signal threshold value line.

The peak group sensor 102a determines whether the distance between two neighboring two peaks is within the reference distance (1014). When the distance between two neighboring peaks is within the reference distance, a process proceeds to step 1015. When the distance between two neighboring peaks is not within the reference distance, a process proceeds to step 1016.

When the distance between two neighboring peaks is within the reference distance, the peak group sensor 102a classifies two peaks into the same group (1015). That is, all of the peaks within the reference distance are classified into one group.

When the distance between two neighboring peaks is not within the reference distance, the peak group sensor 102a classifies two peaks into a different group (1016).

That is, when the peaks which are within the reference distance are repeated, such peaks are classified as one group, while, when a peak which is out of the reference distance is sensed, the peak which is out of the reference distance is classified into a different group.

Referring again to FIG. 9, the peaks included in the first group 940 maintains the distance within the reference distance, such that the peak group sensor 102a classifies the peaks into one group. However, the peak group sensor 102a may find that the distance between a first peak of the second group 950 and a final peak of the first group 940 exceeds the reference distance, and thus, may classify the first peak of the second group 950 and the final peak of the first group 940 into a different group.

Then, the peaks included the second group 950 maintains the distance within the reference distance, such that the peak group sensor 102a may classify those peaks into the same group, that is, the second group 950.

Returning to FIG. 10B, the peak group sensor 102a determines whether all of the peaks are classified into respective groups (1017). If all peaks are not yet classified, the process proceeds to step 1018 and moves to the next peak to repeat the process of steps 1013 to 1017. The process as described above is repeated until all of the peaks are classified. When all of the peaks are classified, the process 1010 of forming a peak group is terminated.

Return to FIG. 10A, the cancellation pulse generators 103, 104, and 105 generate a cancellation pulse for a corresponding peak group (1020).

The apparatus for canceling peak generates an output signal by subtracting the cancellation pulse or a sum of the cancellation pulses from the input signal.

Figure 11:
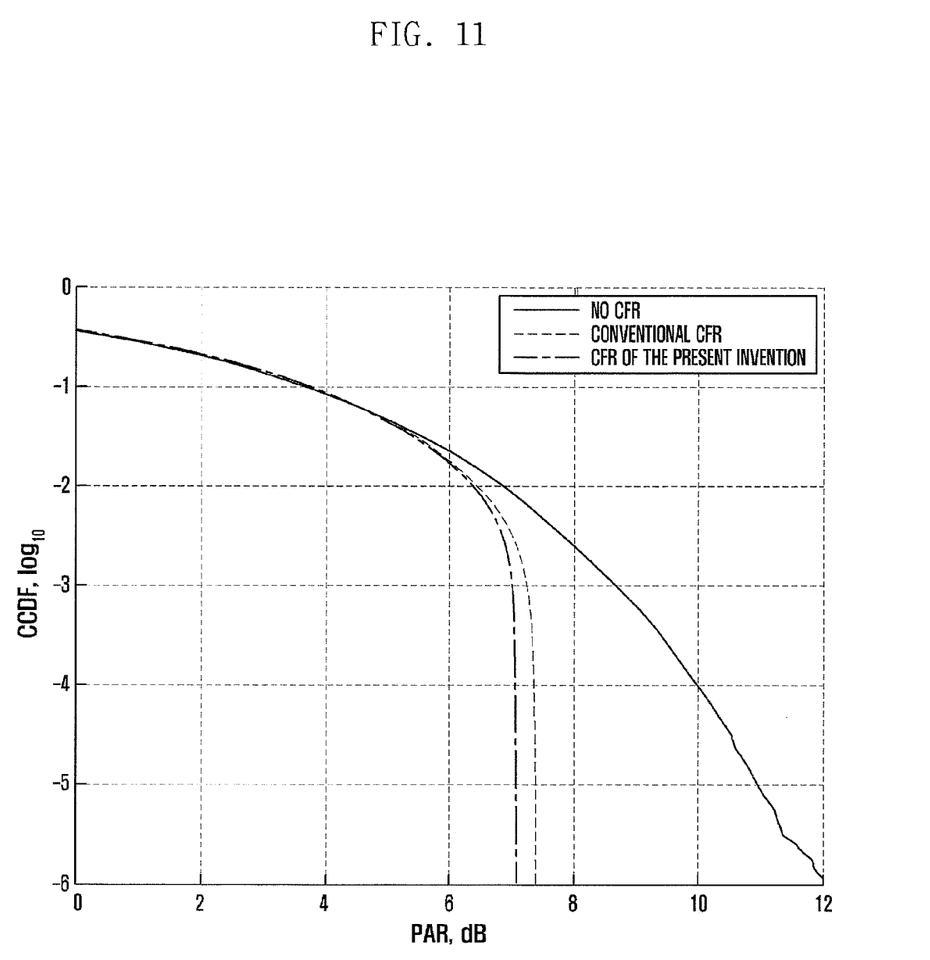
FIG. 11 illustrates an example effect of the peak cancellation method according to an embodiment of the present invention.

FIG. 11 illustrates an effect of the peak cancellation method according to an embodiment of the present invention.

In FIG. 11, a high peak-to-average ratio (PAR) is measured when a crest factor reduction (CFR) is applied or not applied with respect to the same input signal.

Referring to FIG. 11, the PAR using a conventional CFR is enhanced compared to the PAR in the case of peak cancellation, that is, no CFR.

In addition, when the conventional CFR, that is, the cancellation pulse applying method for an individual peak is compared with the cancellation pulse method for a grouped peak of the present invention, it may be known that the PAR of the present invention is better.

At this time, it will be understood that each block depicted in the drawings showing processing flowcharts and those combination may be implemented by computer program instructions. The computer program instructions can be provided in a processor of a general-purpose computer, a special-purpose computer or other programmable data processing apparatus. The instructions executed by the processor of the computer or other programmable data processing device create means for implementing the functions specified in the flow block diagram. These computer program instructions may also be stored in a computer-usable or computer-readable memory that can direct a computer or other programmable data processing apparatus to function in a particular manner. The computer program instructions stored in the computer-usable or computer-readable memory can produce an article of manufacture, including instruction means that implement the functions specified in the blocks of the flowcharts. The computer program instructions may also be loaded onto a computer or other programmable data processing apparatus so as to cause a series of operational steps to be performed on the computer or another programmable apparatus. The computer program instructions executed on the computer or other programmable apparatus produce a computer-based process and thereby provide steps for implementing the functions specified in the blocks of the flowcharts.

Each block in the flowcharts may represent a part of modules, segments, or codes, which comprises one or more executable instructions for implementing the specified logical function(s). It should also be noted that in some alternative implementations, the functions noted in the blocks may occur out of order. For example, two blocks shown in succession may in fact be executed substantially and concurrently or the blocks may be executed in the reverse order, depending on the functionality involved.

As used in this embodiment, the term "~ unit" refers to software or a hardware structural element such as FPGA or ASIC, and the "~ unit" perform some roles. However, the "~ unit" is not limited to software or hardware. The "~ unit" can be configured to be stored in an addressable storage medium and to play at least one processor. Accordingly, for example, the "~ unit" includes software structural elements, object-oriented software structural elements, class structural elements, task structural elements, processes, functions, attributes, procedures, subroutines, segments of a program code, drivers, firmware, microcode, circuit, data, database, data structures, tables, arrays, and variables. Functions provided in structural elements and "~ units" may be engaged by the smaller number of structural elements and "~ units", or may be divided by additional structural elements and "~ units". Furthermore, structural elements and "~ units" may be implemented to play a device or at least one CPU in a security multimedia card.

As described above, according to the exemplary embodiment of the present invention, it is possible to provide a method and an apparatus for a peak cancellation capable of appropriately canceling peaks when several peaks are generated within a short time in an input signal.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method, implemented by a processor, comprising:
sensing a plurality of peaks in an input signal;
measuring a distance between boundaries of neighboring peaks;
forming a peak group comprising the plurality of peaks in the input signal that are within the distance from another peak in the peak group, wherein each of the plurality of peaks has an amplitude greater than a preset signal threshold value, and wherein each of the peaks of the peak group is within a preset reference distance from the other peak in the peak group, and wherein the reference distance comprises a distance between peaks of a preset noise cancellation signal;
generating a single cancellation pulse for the plurality of peaks included in the peak group; and
generating an output signal by subtracting at least the single cancellation pulse from the input signal.

2. The method of claim 1, wherein the peak of the preset noise cancellation signal comprises a signal portion that exceeds a preset pulse threshold value in the noise cancellation signal, and wherein the distance between peaks of the preset noise cancellation signal comprises a distance between boundaries of the peaks of the preset noise cancellation signal.

3. The method of claim 2, wherein the single cancellation pulse is generated according to the preset noise cancellation signal.

4. The method of claim 1, further comprising amplifying the input signal.

5. The method of claim 1, wherein the single cancellation pulse is a sum of a plurality of cancellation pulses.

6. The method of claim 1, wherein the distance between peaks of the preset noise cancellation signal comprises a distance between peaks of at least a main pulse and a secondary pulse.

7. The method of claim 1, wherein the boundaries comprise a portion of the input signal that crosses a signal threshold value.

8. An apparatus comprising:
a peak group sensor configured to:
sense a plurality of peaks in an input signal,
measure a distance between boundaries of neighboring peaks,
form a peak group comprising the plurality of peaks in the input signal that are within the distance from another peak in the peak group, wherein each of the plurality of peaks have an amplitude greater than a preset signal threshold value, and wherein each of the peaks of the peak group is within a preset reference distance from the other peak in the peak group, and wherein the reference distance comprises a distance between peaks of a preset noise cancellation signal;
a cancellation pulse generator (CPG) configured to generate a single cancellation pulse for the plurality of peaks included in the peak group; and
a signal subtraction unit configured to generate an output signal by subtracting at least the single cancellation pulse from the input signal.

9. The apparatus of claim 8, wherein the peak of the preset noise cancellation signal comprises a signal portion that exceeds a preset pulse threshold value in the preset noise cancellation signal, and wherein the distance between peaks of the preset noise cancellation signal comprises a distance between boundaries of the peaks of the preset noise cancellation signal.

10. The apparatus of claim 9, wherein the cancellation pulse generator is configured to generate the single cancellation pulse according to the preset noise cancellation signal.

11. The apparatus of claim 8, further comprising an amplifier configured to amplify the input signal.

12. The apparatus of claim 8, wherein the single cancellation pulse is a sum of a plurality of cancellation pulses.

13. The apparatus of claim 8, wherein the distance between peaks of the preset noise cancellation signal comprises a distance between peaks of at least a main pulse and a secondary pulse.

14. The apparatus of claim 8, wherein the boundaries comprise a portion of the input signal that crosses a signal threshold value.

15. A non-transitory, computer-readable medium comprising one or more executable instructions that, when executed by at least one processor, cause the at least one processor to:
   sense a plurality of peaks in an input signal;
   measure a distance between boundaries of neighboring peaks;
   form a peak group comprising the plurality of peaks in the input signal that are within the distance from another peak in the peak group, wherein each of the plurality of peaks have an amplitude greater than a preset signal threshold value, and wherein each of the peaks of the peak group is within a preset reference distance from the other peak in the peak group, and wherein the reference distance comprises a distance between peaks of a preset noise cancellation signal;
   generate a single cancellation pulse for the plurality of peaks included in the peak group; and
   generate an output signal by subtracting at least the single cancellation pulse from the input signal.

16. The non-transitory, computer readable medium of claim 15, wherein the peak of the preset noise cancellation signal comprises a signal portion that exceeds a preset pulse threshold value in the preset noise cancellation signal, and wherein the distance between peaks of the preset noise cancellation signal comprises a distance between boundaries of the peaks of the preset noise cancellation signal.

17. The non-transitory, computer readable medium of claim 16, wherein the one or more executable instructions further cause the at least one processor to generate the single cancellation pulse according to the preset noise cancellation signal.

18. The non-transitory, computer readable medium of claim 15, wherein the single cancellation pulse is a sum of a plurality of cancellation pulses.

19. The non-transitory, computer readable medium of claim 15, wherein the distance between peaks of the preset noise cancellation signal comprises a distance between peaks of at least a main pulse and a secondary pulse.

20. The non-transitory, computer readable medium of claim 15, wherein the boundaries comprise a portion of the input signal that crosses a signal threshold value.

\* \* \* \* \*